United States Patent
Dhanoa et al.

(10) Patent No.: US 8,064,575 B1
(45) Date of Patent: Nov. 22, 2011

(54) METHOD AND SYSTEM FOR TRANSMISSION OF MESSAGES VIA MULTIPLE MESSAGING SERVERS

(75) Inventors: Shingara S. Dhanoa, Overland Park, KS (US); John Belser, Olathe, KS (US); David McKinney, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1287 days.

(21) Appl. No.: 11/686,112

(22) Filed: Mar. 14, 2007

(51) Int. Cl.
*H04M 11/00* (2006.01)

(52) U.S. Cl. ............... 379/88.13; 379/88.12; 379/88.22; 379/201.01

(58) Field of Classification Search .............. 714/745; 455/413; 379/88.13, 88.17, 88.12, 88.22, 379/201.01
See application file for complete search history.

(56) References Cited

U.S. PATENT DOCUMENTS

| | | |
|---|---|---|
| 2004/0156495 A1 | 8/2004 | Chava et al. |
| 2004/0196858 A1 | 10/2004 | Tsai et al. |
| 2004/0258063 A1 | 12/2004 | Raith et al. |
| 2005/0060411 A1 | 3/2005 | Coulombe et al. |
| 2005/0068971 A1 | 3/2005 | Meisl et al. |
| 2005/0108334 A1 | 5/2005 | Tam et al. |
| 2006/0003745 A1* | 1/2006 | Gogic ............... 455/413 |
| 2006/0029192 A1 | 2/2006 | Duddley et al. |

OTHER PUBLICATIONS

CDG, "MMS Inter-carrier & Inter-standard Interoperability An industry solution," Mar. 2004.
Mobile 365, "Interoperability Services," www.mobile365.com/services/interoperability_services.php, printed from the World Wide Web on Jun. 15, 2006.
Mobile 365, "Interoperability Services," printed from the World Wide Web on Jun. 15, 2006.
Mobile 365, "Mobile Operators," www.mobile365.com/mobile_operators/, printed from the World Wide Web on Jun. 15, 2006.
Kabira Technologies Inc., "Evolution of the Convergent Messaging Market: Software Technology Requirements to Support New Messaging Services," 2003.

* cited by examiner

*Primary Examiner* — Fan Tsang
*Assistant Examiner* — Simon King (57) ABSTRACT

To facilitate improved delivery of messages via multiple messaging servers, a data abstraction layer is provided. When a first messaging server receives a message destined to a particular party served by a second messaging server, the first messaging server queries the data abstraction layer, and the data abstraction layer then queries potentially multiple databases to obtain information usable to facilitate message delivery, including presence data, preference data, and capabilities data, and provides the information to the first messaging server. The first messaging server may use the presence data to decide whether to send the message, and may use the preference data to decide which device should receive the message. When the first messaging server sends the message to the second messaging server, the first messaging server may provide the second messaging server with the capabilities data to facilitate tailoring of the message content for the destination device.

19 Claims, 4 Drawing Sheets

METHOD AND SYSTEM FOR TRANSMISSION OF MESSAGES VIA MULTIPLE MESSAGING SERVERS

FIELD OF THE INVENTION

The present invention relates to network communications and, more particularly, to managing the delivery of messages, such as multimedia messaging system (MMS) messages for instance

BACKGROUND

It is generally known today for wireless communication devices, such as cell phones and wirelessly equipped personal digital assistants (PDAs) and computers to be able to engage in wireless packet-data communications and to thereby wirelessly send and receive messages and other content. A wireless carrier, for instance, may operate a radio access network (RAN) and packet-data serving node (PDSN) that cooperatively establish wireless packet-data connectivity between WCDs served by the carrier and a packet-switched network such as the Internet or a private packet network.

In usual practice, a WCD initiates acquisition of a packet-data connection by sending a packet-data origination message over an air interface access channel to the carrier's RAN. In response, the RAN then assigns an air-interface traffic channel for use by the WCD, and the RAN signals to a packet data serving node (PDSN) or other gateway, which negotiates with the WCD to set up a data link layer connection. In addition, the gateway or a mobile-IP home agent assigns an IP address for use by the WCD to engage in packet-data communications. The WCD may then communicate with other entities on the packet-switched network in much the same way that a traditional personal computer would, except that the WCD would communicate over a wireless air interface and via the RAN.

One difficulty with this kind of arrangement is that it typically precludes pushing of packet-data communications to a WCD, i.e., sending of packet-data to a WCD, without the WCD initially requesting the data. Rather, in order for a WCD to receive packet-data, the WCD must usually first acquire packet-data connectivity and then request the data. For instance, to receive content from a particular URL, the WCD must first acquire packet-data connectivity and then send an HTTP request seeking content from that URL.

One well-accepted way to overcome this limitation is to send a specially-coded data-notification message over an air interface control channel to the WCD, such that the WCD receives the data-notification message without needing to acquire packet-data connectivity. The data-notification message may take the form of an SMS message of the type defined by industry standard protocol published as EIA/TIA IS-637 for instance, carrying a special code that designates it as a data notification message and carrying a URL of a network location where the data to be delivered is stored. Upon receipt of such a data-notification message (and detection that it is such a message), the WCD may then automatically acquire data connectivity and send an HTTP request to obtain the data from the designated URL.

Systems that deliver data in this manner go by various names, such as "WAP Push" and, more recently, "Multimedia Messaging Service" (MMS) (which actually uses WAP Push technology). MMS messaging, for instance, is commonly used to send media such as digital images or video clips to a WCD.

To send an MMS message to a WCD, for instance, a message-sender delivers to special MMS server known as an MMS Center or MMS Controller ("MMSC") an MMS message file that contains an MMS header typically followed by a multipart binary MIME message defining the content. The server then stores the MMS message and transmits a subset of the MMS header as an MMS notification message (MMS message type "m-notification-ind") via SMS to the WCD together with a URL pointer to a location of the complete message on the MMS server. Upon receipt of the MMS notification message, and possibly upon receipt of user approval, program logic on the WCD would then automatically send an HTTP request to download the message from the designated URL.

In some instances, it may be necessary to transmit an MMS message between MMS systems, such as between an MMS system operated by one carrier and an MMS system operated by another carrier. This may occur when a party served by one carrier desires to send an MMS message to a party served by the other carrier, for instance. To transmit an MMS message between systems, an MMSC serving the sending party may receive an MMS message from the sending party and may then send the MMS message via a network to an MMSC serving the destination party. The MMSC serving the destination party may then store the message content and generate and send an MMS notification message to the destination party, and the destination party may responsively retrieve the stored message content.

SUMMARY

The present invention provides improvements in connection with inter-system message delivery, such as delivery of an MMS message from a first MMS system serving a sending party to a second MMS system serving a destination party. More generally, the invention can apply in a scenario where a message is to be transmitted via a plurality of messaging servers, such as between a first messaging server serving a first party and a second messaging server serving a second party. In that scenario, the message would need to pass from the first party to the first messaging server, from the first messaging server to the second messaging server, and then from the second messaging server to the second party. Further, the invention can apply in other scenarios as well, such as when the message will pass through additional messaging servers, when the first or second messaging servers do not directly serve the first or second parties, and regardless of the messaging protocol used.

An exemplary embodiment of the invention provides a data abstraction layer that is accessible by multiple messaging servers, including the first messaging server and second messaging server for instance, and that helps to facilitate streamlined delivery of messages from one party to another. As a general matter, when a first messaging server has a message to send directly or indirectly to a particular party, the first messaging server may send a query message to the data abstraction layer, the data abstraction layer may responsively obtain assorted useful information to assist in delivery of the message to the destination party, and the data abstraction layer may provide the information to the first messaging server.

Preferably, a portion of the information that the data abstraction layer provides to the first messaging server will be presence information regarding the destination party, such as information regarding the current online status and/or availability of the destination party. In accordance with the exemplary embodiment, the first messaging server will use that presence information as a basis to decide whether and when to send the message to the second messaging server for delivery to the destination party. For instance, if the presence information indicates that the destination party is not currently available, the first messaging server may hold the message until later, rather than sending the message to the second messaging server for handling.

Also preferably, a portion of the information that the data abstraction layer provides to the first messaging server will be capabilities information that indicates or represents one or more capabilities (e.g., hardware or software features) of the destination party. Advantageously in accordance with the exemplary embodiment, once the first messaging server obtains this capabilities information from the data abstraction layer, the first messaging server will send the capabilities information (or some variant on the capabilities information) to the second messaging server, to allow the second messaging server to process the message.

Conveniently, the second messaging server can then process the message based on the provided capabilities information, without the need for the second messaging server to itself query a capabilities data store to determine the indicated capabilities. Using such information, for instance, the second server could translate the message content into a form suitable for receipt and presentation by the destination party and could then send the translated content along to the destination party.

Still further, a portion of the information that the data abstraction layer provides to the first messaging server may be preference (contrasted with "presence") information, such as information indicating which of a plurality of devices should receive a message destined to the destination party. For instance, if the message is destined to a party defined by a destination user-ID (e.g., network access identifier, or SIP address) and the user has a plurality of messaging devices that could theoretically receive the message (albeit some possibly requiring the message to be translated to some other form), the preference data may indicate which device the user prefers to have receive the message—based on various factors such as time of day, message-sender identity, and the like.

A great advantage of system that operates in accordance with this exemplary arrangement is that much useful information can be obtained by the first messaging server querying the data abstraction layer, without the need for the first messaging server to itself query various data sources that the data abstraction can access. For instance, with the exemplary arrangement, the first messaging server itself would not need to query presence data, capabilities data, and preference data, since the data abstraction layer can respond to a simple query from the first messaging server by referencing those data sources on behalf of the first messaging server and then responding to the first messaging server. Consequently, the exemplary embodiment may help to reduce the burden on the first messaging server.

Furthermore, the exemplary embodiment helps to reduce the burden on the second messaging server by having the first messaging server obtain useful information regarding delivery of the message and provide that information to the second messaging server—preferably with the message being delivered. For instance, as noted above, by having the first messaging server learn capabilities of the destination party and provide that capabilities information to the second messaging server, the second messaging server can tailor the message delivery (e.g., by translating the message content to some other language or form) to suit the destination party, without the need for the second messaging server to separately query a capabilities data store.

These as well as other aspects, advantages, and alternatives, will become apparent to those of ordinary skill in the art by reading the following detailed description, with reference where appropriate to the accompanying drawings.

DETAILED DESCRIPTION

Figure 1:
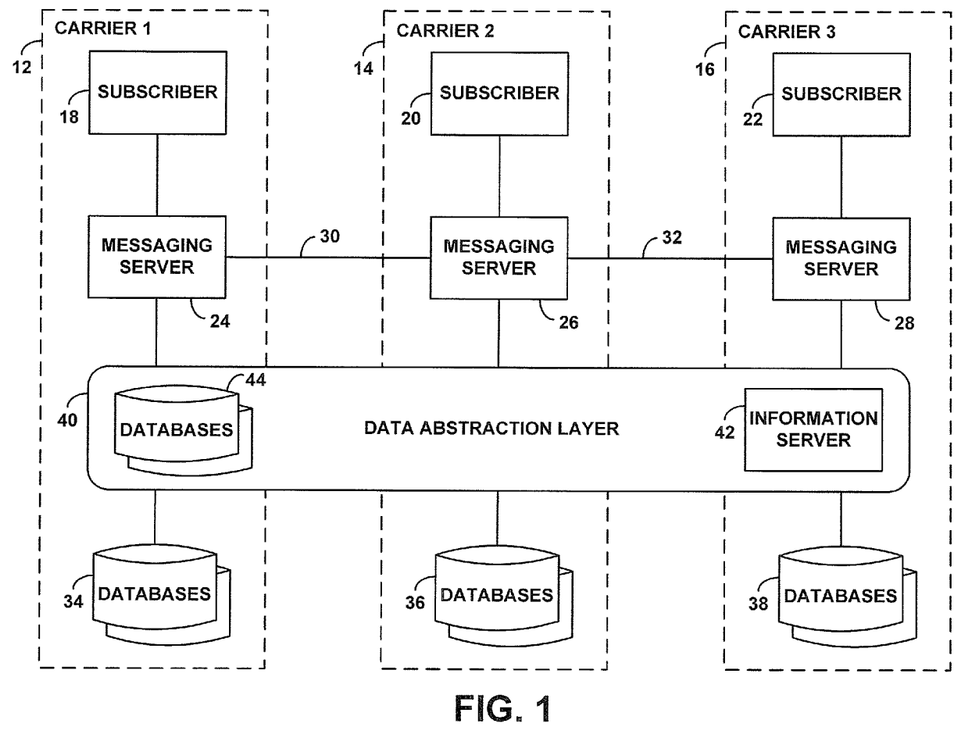
FIG. 1 is a simplified block diagram of an arrangement for carrying out an exemplary embodiment of the invention.

Referring to the drawings, FIG. 1 is a simplified block diagram illustrating components of an arrangement for carrying out an exemplary embodiment of the invention in practice. As shown in FIG. 1, the exemplary arrangement includes a plurality of serving networks, including a first network 12, a second network 14, and an nth network. Each of these networks may be owned and operated by a respective telecommunication service provider, such as a respective wireless carrier for instance. As such, each network may serve various subscribers. For instance, network 12 is shown serving a first subscriber 18, network 14 is shown serving a second subscriber 20, and network 16 is shown serving an nth subscriber 22.

Each network is further shown including a respective messaging server, which functions to facilitate messaging communication with served subscribers. In particular, network 12 is shown including a first messaging server 24, network 14 is shown including a second messaging server 26, and network 16 is shown including an nth messaging server 28. To facilitate inter-network messaging, these messaging servers are preferably linked together by communication links 30, 32, which may be packet-switched, circuit-switched, wireless and/or landline links. In one embodiment, for instance, the messaging servers may have Internet connectivity, and links 30, 32 may represent Internet connections.

As a general matter, with the arrangement described so far, a subscriber served by one of the networks can send a message to a subscriber served by another one of the networks, through communication between the networks' messaging servers. For instance, if subscriber 18 has a message to send to subscriber 20, subscriber 18 can send a message, with a destination address of subscriber 20, to messaging server 24. Upon receipt, messaging server 24 may then perform an address lookup keyed to the address of subscriber 20, to determine that messaging server 26 serves subscriber 20, and messaging server 24 may accordingly forward the message via link 30 to messaging server 26. When messaging server 26 receives the message, messaging server 26 may then forward the message to subscriber 20.

As further shown, each network may include one or more databases of information usable to facilitate delivery of messages. For instance, network 12 is shown including databases 34, network 14 is shown including databases 36, and network 16 is shown including databases 38. In each network, these databases might provide information such as the presence state of various served subscribers, the transmission preferences of various subscribers, and the capabilities of various subscribers. For instance, in a given network, one database (e.g., database server) might maintain presence information indicating on a per subscriber basis whether the subscriber is currently online, whether the subscriber is currently engaged in a communication, where the subscriber is located, and/or other sorts of presence information, in a manner well known in the art. Another database (e.g., database server) might maintain subscriber profile data indicating the address (e.g., device) to which communications destined to a particular subscriber should be sent, perhaps based on time of day or the like. And yet another database (e.g., database server) might maintain device-capabilities information indicating various features/capabilities on a per subscriber or per device basis.

In basic operation, within a given network, when the messaging server serving a subscriber receives a message destined to the subscriber, the messaging server might dip into the network's databases to determine various information to facilitate message delivery. For example, the messaging server might dip into the network's presence data to determine whether the destination subscriber is currently online and perhaps whether the subscriber is currently engaged in a communication. Based on that information, the messaging server may then determine whether to send the message to the subscriber or not. (For instance, if the presence data indicates that the subscriber is not online or is currently engaged in a communication), the messaging server may hold the message for later delivery.)

As another example, the messaging server might dip into the network's preference data to determine the address to which the messaging server should send the message. For instance, if the subscriber has multiple different devices (each with a corresponding address) that could theoretically receive the message, the preference data may tell the messaging server which destination address (e.g., which device and thus which destination address) to use.

And as another example, the messaging server might dip into the capabilities data to determine the capabilities of the destination subscriber. For instance, assuming the subscriber corresponds with a particular device (possibly indicated by the preference data), the messaging server may query the capabilities data to determine features/capabilities of that device and may thereby determine that the message content should be translated to some other language or form (e.g., text to voice, voice to text, etc.) before sending the message along to the destination device. The messaging server may then perform the translation (or have the translation function performed) so that the content gets sent in translated form to the destination device.

As noted above, having a messaging server perform multiple database dips like this can be burdensome. Furthermore, it may be a waste of resources for a first messaging server to send a message to a second messaging server if the destination party served by the second messaging server is currently unavailable to receive the message. As presently contemplated, it would be better if the first messaging server would determine the destination party's presence and determine based on the presence whether to send the message to the second messaging server. Further, as long as the first messaging server would go through the effort to determine the destination party's presence, it would also be efficient for the first messaging server to determine the destination party's capabilities and send those capabilities to the second messaging server, rather than requiring the second messaging server to have to request that information.

In accordance with the exemplary embodiment, as shown in FIG. 1, a data abstraction layer 40 is provided to facilitate this more efficient solution. As shown, the data abstraction layer 40 preferably extends across multiple networks or is at least accessible by multiple messaging servers (regardless of whether the messaging servers are in different carrier networks). As a general matter, the data abstraction layer enables a messaging server to readily obtain multiple pieces of information to facilitate message delivery, without requiring the messaging server to separately query multiple data sources such as the presence, preference, and capabilities databases mentioned above. Furthermore, the data abstraction layer enables a first messaging server to useful information, such as destination device capabilities information, that the first messaging server can send to the second messaging server to facilitate message delivery.

In the exemplary embodiment, the data abstraction layer 40 would likely include one or more computer servers 42, hereafter referred to as an "informational server," with which the various messaging servers can communicate. The informational server 42 may in turn be in communication with the various databases of information that would otherwise be accessible directly to particular messaging servers, so that the informational server 42 can obtain useful information and provide the information to the various messaging servers. In the arrangement shown in FIG. 1, the informational server 42 may communicate with the databases 34, 36, and 38 in the various networks 12, 14, 16, and may provide information that it gleans from one network's databases to a messaging server in another one of the networks. For instance, upon receipt of a query from messaging server 24 regarding a message to be sent from subscriber 18 to subscriber 20, the informational server 42 may determine that messaging server 26 serves subscriber 20 and may consequently dip into databases 36 (corresponding with messaging server 26) to obtain information about client 20. Further, the informational server is preferably programmed to support various communication protocols, such as LDAP, SOAP/XML, ODBC, and others now known or later developed.

In an alternative arrangement, note that the informational server 42 may have access to a replicated and/or more centralized version of the various databases and may thus be able to obtain various pieces of useful information without querying the databases in the messaging servers' networks. In particular, as shown, the data abstraction layer 40 may include one or more databases 44 that can be populated periodically through automated or manual communication with the networks 12, 14, 16, such as through automated synchronization messaging with servers hosting databases 34, 36, 38 for instance. (Alternatively, the centralized databases could be hosted on one of the carrier's networks or elsewhere.) In practice, the informational server 42 could then simply dip into those centralized databases to obtain the information it will provide in response to a querying messaging server.

Figure 2:
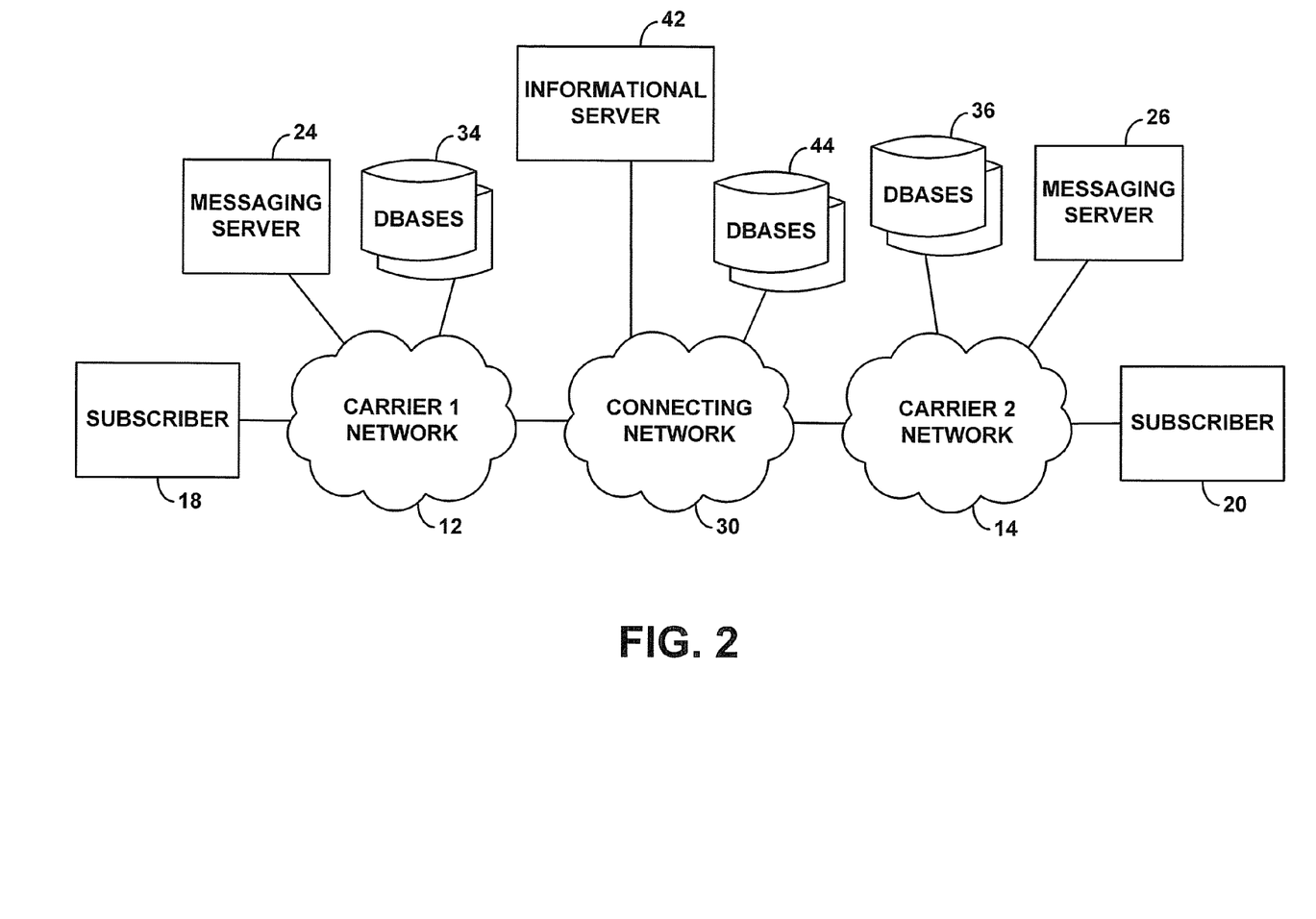
FIG. 2 is another simplified block diagram of an arrangement for carrying out the exemplary embodiment.

FIG. 2 next depicts more specifically a network arrangement in which the exemplary embodiment can be implemented, to explain by way of example where elements shown in FIG. 1 can be positioned in practice. FIG. 2 illustrates each of networks 12 and 14 as a respective network cloud. Sitting as nodes on network 12, or otherwise having a connection or communication link with network 12, are subscriber 18, messaging server 24, and multiple databases (such as presence, preference, and capabilities databases) 34. Similarly, sitting as nodes on network 14, or otherwise having a connection or communication link with network 14, are subscriber 20, messaging server 26, and multiple databases (such as presence, preference, and capabilities databases) 36. Further, FIG. 2 shows a connecting network (such as the Internet, for instance) functioning as communication link 30 between network 12 and network 14. In this exemplary arrangement, informational server 42 then sits as a node on connecting network 30 or is otherwise accessible through connecting network 30. Additionally, centralized databases 44 are also shown sitting on or accessible through connecting network 30, for reference by informational server 42.

With this arrangement, when messaging server 24 receives a message from subscriber 18, destined to subscriber 20, messaging server 24 may send a query message via network 12 and network 30 to informational server 42. Informational server 42 may then query the multiple databases 36 of network 14, through communication via network 30 and network 14 (possibly interacting through a front end server provided by network 14), to obtain useful information. Alternatively, informational server 42 may more simply query central databases 44 to obtain the useful information. And informational server 42 may then send the useful information in a response message via network 30 and network 12 to messaging server 24, to facilitate message delivery.

Figure 3:
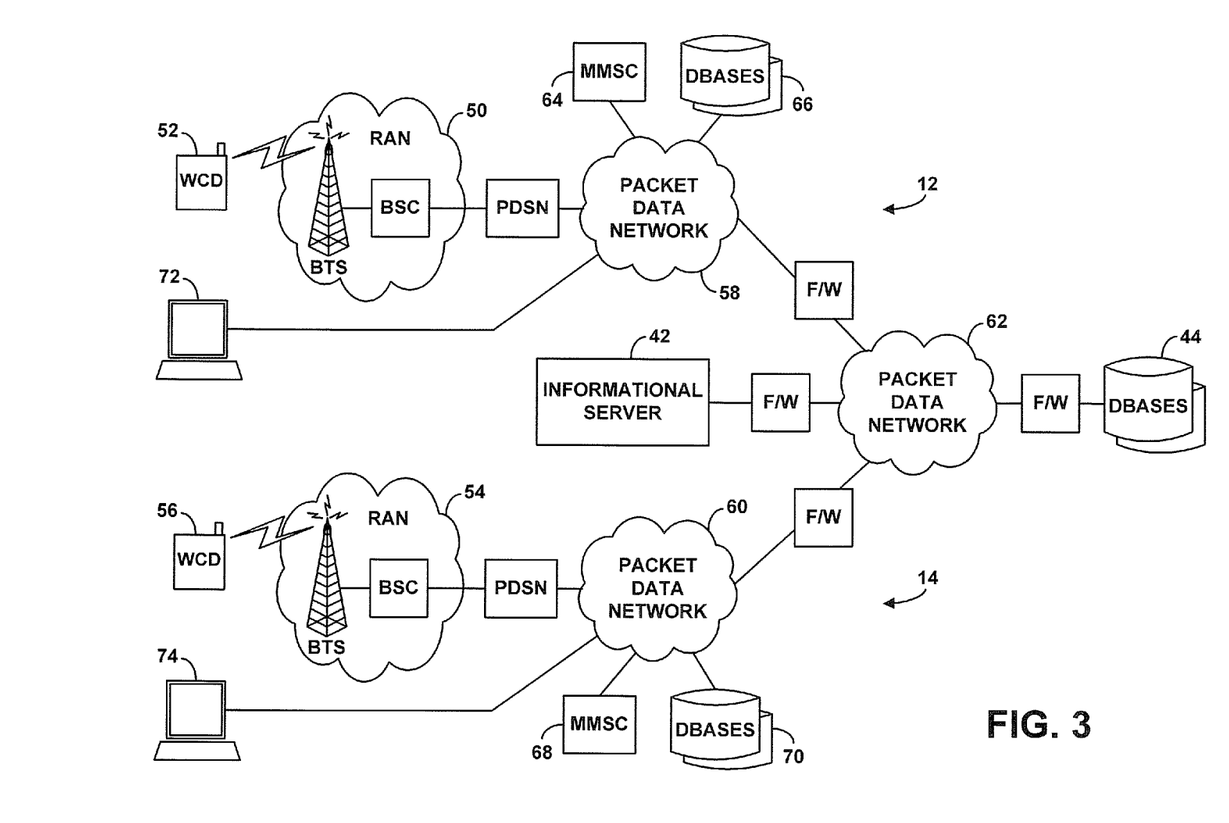
FIG. 3 is another simplified block diagram of an arrangement for carrying out the exemplary embodiment.

FIG. 3 is next an even more specific network block diagram, showing how the arrangement of FIG. 2 can be applied with respect to wireless communication devices and MMS messaging. In FIG. 3, each carrier network 12, 14 is shown to include a radio access network (RAN) configured to serve wireless communication devices. In particular, carrier network 12 is shown including a RAN 50 arranged to serve WCDs such as WCD 52, and carrier network 14 is shown including a RAN 54 arranged to serve WCDs such as WCD 56. In the example arrangement, each RAN includes a base transceiver station (BTS) arranged to communicate over an air interface with served WCDs. Further, each RAN includes a base station controller (BSC) that controls BTS communications. Each BSC is in turn coupled with a packet data serving node (PDSN) that provides connectivity with a packet-data network operated by the serving carrier. In particular, RAN 50 connects with packet-data network 58, and RAN 54 connects with packet-data network 60.

Packet-data networks 58, 60 are further shown being coupled with a connecting packet-data network 62, such as the Internet, preferably through a firewall for security purposes. And shown sitting on the connecting network 62 is the informational server 42 and centralized databases 44, also preferably through a secure firewalls.

Additionally shown sitting on each carrier's packet-data network is a respective MMSC, arranged to provide MMS messaging services for WCDs served by the carrier, as well as various databases that can provide useful information to facilitate delivery of messages to served subscribers. In particular, a first MMSC 64 and databases 66 sit on the first carriers' packet-data network 58, a second MMSC 68 and databases 70 sit on the second carrier's packet-data network 60.

Further, as shown, each carrier's network may additionally serve other types of devices beyond the WCDs shown. For example, the first carrier's network 12 may serve a client personal computer 72, and the second carrier's network 14 may serve a client personal computer 74.

As discussed above, in some instances, an MMSC may receive a message destined to a given subscriber and may determine by reference to subscriber preference data that the message should be sent to a particular client device. For instance, if a given subscriber owns both WCD 52 and personal computer 72, at issue may be where to send an MMS message destined to that subscriber. In practice, when MMSC 64 receives such a message, MMSC 64 may query subscriber profile data in one of the databases 66 on packet data network 58 and may thereby determine based on predefined subscriber preferences whether to send the message to WCD 52 or personal computer 72. MMSC 64 may then send the message to the selected destination device.

Furthermore, in some instances, it may be appropriate for an MMSC to translate the form of message content in view of the capabilities of the device to which the MMSC will be sending the message. For instance, if MMSC 64 determines from preference data that the message is to be sent to WCD 52, MMSC 64 may further determine based on device capabilities data in databases 66 that WCD 52 has a particularly small display screen and so MMSC 64 may responsively translate the message content from text into audible speech and may deliver the speech file via MMS for audible playout at WCD 52. As another example, if MMSC 64 determines from preference data that the message is to be sent to personal computer 72, MMSC 64 may further determine based on the device capabilities data that personal computer 72 can support robust multimedia presentations and so MMSC 64 may deliver the message content in more robust form via MMS or another protocol to computer 72.

Figure 4:
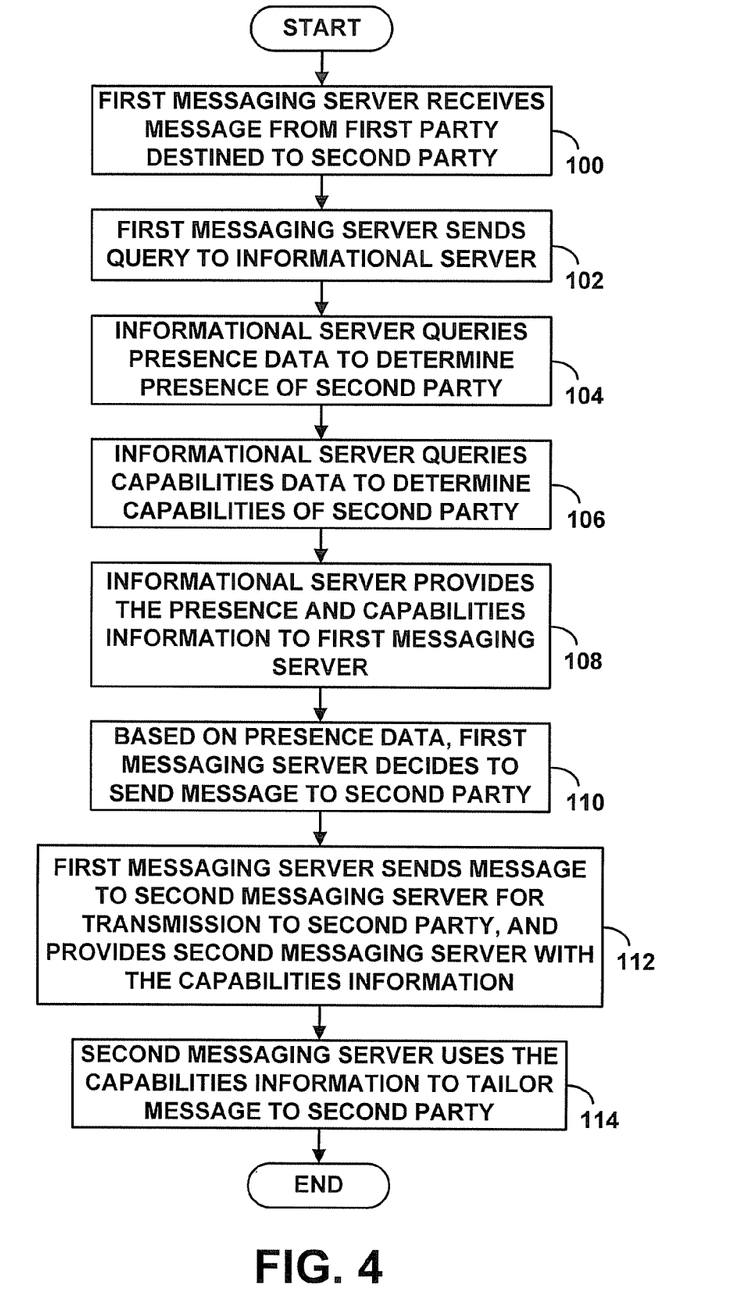
FIG. 4 is a flow chart depicting functions carried out in accordance with the exemplary embodiment.

FIG. 4 is next a flow chart depicting functions that may be carried out in accordance with the exemplary embodiment, when delivering a message from a first party to a second party. As shown in FIG. 4, at step 100, a first messaging server receives a message sent from a first party and destined for delivery to a second party. At step 102, the first messaging server then responsively sends a query to an informational server that is a functional element (or elements) of the exemplary data abstraction layer. The query message could take the form of an IP datagram, an HTTP message, or any other sort of message now know or later developed, depending on the communication path or other factors, and could be translated as it passes from the first messaging server to the informational server.

In response to the query from the first messaging server, at steps 104 and 106, the informational server then queries presence-data to obtain presence information indicating whether the second party is available to receive the message, and the informational server queries capabilities-data to obtain capabilities information indicating one or more capabilities of the second party. At step 108, the informational server then provides the presence information and capabilities information in a reply message to the first messaging server. The reply message can similarly take any form now known or later developed.

Based on the presence information provided in the reply from the informational server, the first messaging server then decides at step 110 to send the message to the second party. Accordingly, at step 112, the first messaging server then sends the message to a second messaging server for transmission in turn to the second party, preferably also providing the second messaging server with the capabilities information for use by the second messaging server to process the message.

As noted above, the message at issue may be an MMS message that defines message content. As such, the act of first messaging server sending the message to the second messaging server for transmission to the second party at step 112 may involve the first messaging server sending the MMS message to the second messaging server. Upon receipt of the MMS message, the second messaging server may then store the message content and send an MMS notification message to the second party, directing the second party to retrieve the stored message content. Alternatively, the first messaging server may store the message content in an accessible location and send an MMS notification message to the second messaging server, which the second messaging server may forward to the second party. The second party may then retrieve the stored message content from the location where the first messaging server stored it.

In addition, the act of the first messaging server providing the second messaging server with the capabilities information at step 112 for use by the second messaging server to process the message can involve the first messaging server sending the message and capabilities information together to the second messaging server. For instance, if the message is an MMS message and the first messaging server sends the MMS message to the second messaging server, the first messaging server can provide the capabilities information within MMS header fields of the MMS message itself, so that the second messaging server would conveniently receive the capabilities information when the second messaging server receives the MMS message.

As noted above, assuming the message defines (e.g., contains) message content, the exemplary method may also involve the second messaging server using the capabilities information provided by the first messaging server as a basis to translate the message content into a form depending on the one or more capabilities indicated by the capabilities information. Advantageously, the second messaging server may do this before delivering the content to the second party, such as by translating the content and storing the content in translated form so that the content ultimately acquired by the second party (effectively delivered to the second party by the second messaging server) would be the translated content. In the event the content was stored by the first messaging server at an accessible location and the first messaging server sent an MMS notification message to the second messaging server, the second messaging server could translate the content at that accessible location or could retrieve the content from that location, translate it, store it at a new location, and modify the notification message to reference the new location.

The act of translating the content based on the indicated capabilities information could take various forms. For example, if the recipient device has minimal presentation functions (such as a small display screen for presenting video content), the act may involve translating heavy content (e.g., large scale video at a high resolution) to lighter content (e.g., small scale video at a lower resolution). As another example, if the recipient device does not have display functionality but supports audio presentation, and if the message content comprises text or other visual content, the act of translating the content may involve translating the message content to an audible format, such as by converting text to speech. The server could then send the resulting audible format content to the recipient device for playout audibly to a user of the device. And as yet another example, if the recipient device supports limited bandwidth communication (e.g., being connected by a dial-up connection rather than a broadband connection), the server could strip some aspects of the content to minimize its download time.

In the exemplary embodiment, the presence data may comprise data maintained by a presence server, and the data preferably indicates whether the second party is currently available to receive the message. For instance, the presence data may indicate whether the second party is currently online, currently not on a call (if that would be feasible—depending on device type), currently in particular location, not in a meeting, or other forms of presence data now known or later developed that can assist in determining based on predefined rules logic whether the second party is currently available. Such presence data could be maintained and kept updated in a database of the presence server through regular presence updates sent from the second party and/or from an entity operating on behalf of the second party (e.g., a gateway entity), using well known SIP presence messaging for instance.

If the determination, based on the presence data, is that the second party is not currently available, then the first messaging server may hold the message and check on the presence status again later. Alternatively, if the determination is that the second party is currently available, then the first messaging server may send the message to the second messaging server for delivery to the second party. In any event, if the presence data is maintained by a presence server, then the act of the informational server querying the presence data at step 104 may involve the informational server querying the presence server to facilitate this functionality.

As additionally noted above, the method may further involve the informational server querying preference data to determine a destination address to which the message destined to the second party should be sent. The preference data may be maintained in a subscriber profile record within a subscriber profile database and may be established a serving carrier or by the second party, e.g., through a web interface or in some other manner now known or later developed.

The informational server may then inform the first messaging server of the determined destination address, preferably by including the destination address within the reply that the informational server sends to the first messaging server. Provided with the destination address, the first messaging server may then advantageously convey that destination address to the second messaging server, also preferably together with the message itself, so that the second messaging server can conveniently know where to send the message again without the need for the second messaging server to itself query the preference data.

In an exemplary arrangement, the preference data may correlate the second party with a particular device having a particular address. For instance, as noted above, if the second party is identified by a user-ID or more generally by a device-independent ID (e.g., NAI and/or SIP address) that might possibly cover multiple devices operable by a given user or group of users, the preference data could indicate which device should receive a message destined to the second party, possibly providing different indications depending on factors such as time of day, sender-ID, location information, and so forth. Furthermore, the preference data or other associated data may specify a destination address respectively for each such device. Thus, by querying the preference data, the informational server may determine which device and which destination address, or at least which destination address, to use for addressing the second party.

In addition, according to the exemplary embodiment, the first messaging server can select the second messaging server based on the determined address of the second party. For instance, the first messaging server may determine that the destination address is served by a particular second messaging server and responsively send the message to that second messaging server for transmission in turn to the second party. Alternatively, the informational server may itself determine the second messaging server to use, such as by querying an address translation system or the like, and, in its reply to the first messaging server, the informational server may inform the first messaging server of the address of the second messaging server. Conveniently, the first messaging server may then send the message to that second messaging server for transmission in turn to the second party.

Note also that the act of the informational server querying the presence data at step 104 can occur in response to, or based upon, the informational server's identification of the destination device. For instance, once the informational server has identified the destination device to which the message should be sent, the informational server may then query presence data to determine the availability of that particular destination device to receive the message. As such, one destination device correlated with a given party might be currently available, while another destination device correlated with that same party might not be currently available.

Likewise, the act of the informational server querying capabilities data at step 106 can occur in response to, or based upon, the informational server's identification of the destination device. In particular, once the informational server has identified the destination device to which the message should be sent, the informational server may then query the capabilities data to determine one or more capabilities of that particular destination device. That way, the capabilities information that the informational server sends in a reply to the first messaging server, and that the first messaging server sends along to the second messaging server, preferably indicates one or more capabilities of the particular device to which the second messaging server will then transmit the message. Advantageously, the second messaging server can then readily tailor the message content to the particular destination device, again without the need to itself query the capabilities data.

In another respect, the exemplary embodiment may take the form of a messaging system arranged to carry out the exemplary method. Such a system may take the form shown in FIGS. 1-3 and may thus include a first messaging server interconnected to a network and serving a first party, a second messaging server interconnected to the network and serving a second party, and an informational server interconnected to the network and accessible by both the first messaging server and the second messaging server.

In such a system, the first messaging server may receive from the first party a message destined to the second party, and may responsively send a query to the informational server. In response to the query, the informational server may then (i) query presence data to obtain presence information indicating whether the second party is available to receive the message, (ii) query capabilities data to obtain capabilities information indicating one or more capabilities of the second party, and (iii) provide the presence information and capabilities information in a reply to the first messaging server. Further, the first messaging server may then decide, based on the presence information, to send the message to the second party and may then responsively send the message to the second messaging server for transmission in turn to the second party. Additionally, the first messaging server may provide the second messaging server with the capabilities information for use by the second messaging server to process the message.

In this system, the first messaging system may comprise a first MMSC, and the second messaging server may comprise a second MMSC. In that case, the message may comprise an MMS message that defines message content. Thus, with the exemplary system, the first MMSC can advantageously obtain useful presence and capabilities information from the informational server or generally from the data abstraction layer. And the first MMSC may use the presence information as a basis to decide whether to currently send the MMS message to the second MMSC for transmission to the second party. Further, the first MMSC may provide the second MMSC with the capabilities information that the first MMSC received from the informational server. For instance, the first MMSC may provide the capabilities information to the second MMSC within one or more MMS message headers.

The exemplary system may further operate as described above to determine a destination address of the second party. For instance, in response to the query from the first messaging server, the informational server may query preference data to determine a destination address to which the message destined to the second party should be sent, and the informational server may indicate that destination address in the reply that it sends to the first messaging server. Further, the first messaging server may then provide the determined destination address to the second messaging server, again preferably together with the message, so that the second messaging server could then readily transmit the message to the indicated destination address.

Those skilled in the art will appreciate that the various entities described above as carrying out various functions may each comprise a processor, data storage, and program instructions stored in the data storage and executable by the processor to carry out the indicated functions. Alternatively or additionally, the entities may comprise firmware and/or other hardware for carrying out the various functions.

An exemplary embodiment of the invention has been described above. Those skilled in the art will appreciate that numerous variations from the embodiment described (including addition, combination, omission, or distribution or structural elements or functions) are possible while remaining within the true scope and spirit of the invention as claimed.

What is claimed is:

1. A method comprising:
   receiving into a first messaging server a message sent from a first party and destined to a second party;
   responsive to the message, the first messaging server sending a query to an informational server;
   responsive to the query, the informational server (i) querying presence data to obtain presence information indicating whether the second party is available to receive the message, (ii) querying capabilities data to obtain capabilities information indicating one or more capabilities of the second party, and (iii) providing the presence information and capabilities information in a reply to the first messaging server; and
   the first messaging server then deciding, based on the presence information, to send the message to the second party and responsively sending the message to a second messaging server for transmission in turn to the second party, the first messaging server further providing the second messaging server with the capabilities information for use by the second messaging server to process the message.

2. The method of claim 1, wherein the message comprises an MMS message defining message content.

3. The method of claim 2, wherein sending the message to the second messaging server for transmission in turn to the second party comprises sending the MMS message to the second messaging server, wherein the second messaging server then stores the message content and sends an MMS notification message to the second party directing the second party to retrieve the stored message content.

4. The method of claim 1, wherein providing the second messaging server with the capabilities information for use by the second messaging server to process the message comprises sending the message and capabilities information together to the second messaging server.

5. The method of claim 1, wherein the message defines message content, the method further comprising:
   the second messaging server using the capabilities information provided by the first messaging server to translate the message content into a form depending on the one or more capabilities indicated by the capabilities information; and
   the second messaging server delivering the translated message content to the second party.

6. The method of claim 1,
wherein the presence data is maintained by a presence server, and querying the presence data comprises querying the presence server.

7. The method of claim 1, wherein the informational server defines a centralized data abstraction layer accessible by multiple messaging servers, including the first messaging server and others, so that each messaging server can query the informational server to facilitate message delivery.

8. The method of claim 1, further comprising:
responsive to the query, the informational server querying preference data to determine a destination address to which the message destined to the second party should be sent, and the informational server informing the first messaging server of the determined destination address,
wherein the first messaging server further provides the second messaging server with the determined destination address for use by the second messaging server to process the message.

9. The method of claim 8, wherein the first messaging server selects the second messaging server based on the determined destination address.

10. The method of claim 8, wherein the preference data correlates with the second party a particular device having a particular address, and querying the preference data to determine the destination address comprises querying the preference data to determine as the destination address the address of the particular device.

11. The method of claim 1, wherein deciding, based on the presence information, to send the message to the second party comprises deciding, based on the presence information, when to send the message to the second party.

12. A method comprising:
receiving into a first messaging server a message sent from a first party and destined to a second party;
responsive to the message, the first messaging server sending a query to an informational server;
responsive to the query, the informational server (i) querying presence data to obtain presence information indicating whether the second party is available to receive the message, (ii) querying capabilities data to obtain capabilities information indicating one or more capabilities of the second party, and (iii) providing the presence information and capabilities information in a reply to the first messaging server; and
the first messaging server then deciding, based on the presence information, whether to currently send the message to the second party and (i) if so, then sending the message to the second messaging server for transmission in turn to the second party, and providing the second messaging server with the capabilities information for use by the second messaging server to process the message, whereas (ii) if not, then holding the message for later delivery.

13. The method of claim 12, wherein deciding, based on the presence information, whether to currently send the message to the second party comprises:
determining, based on the presence information, whether the second party is currently available to receive the message and (i) if so, then deciding to currently send the message to the second party, whereas (ii) if not, then deciding to not currently send the message to the second party.

14. A messaging system comprising:
a first messaging server interconnected to a network and serving a first party;
a second messaging server interconnected to the network and serving a second party; and
an informational server interconnected to the network and accessible by both the first messaging server and the second messaging server,
wherein, when the first messaging server receives from the first party a message destined to the second party, the first messaging server sends a query to the informational server,
wherein, in response to the query, the informational server (i) queries presence data to obtain presence information indicating whether the second party is available to receive the message, (ii) queries capabilities data to obtain capabilities information indicating one or more capabilities of the second party, and (iii) provides the presence information and capabilities information in a reply to the first messaging server,
wherein the first messaging server then decides, based on the presence information, to send the message to the second party and responsively sends the message to the second messaging server for transmission in turn to the second party, and wherein the first messaging server provides the second messaging server with the capabilities information for use by the second messaging server to process the message.

15. The system of claim 14, wherein the informational server defines a centralized data abstraction layer accessible by multiple messaging servers, including the first messaging server and others, so that each messaging server can query the informational server to facilitate message delivery.

16. The system of claim 14, wherein the first messaging server comprises a first multimedia messaging service controller (MMSC), wherein the second messaging server comprises a second MMSC, and wherein the message comprises an MMS message defining message content.

17. The system of claim 14,
wherein, in response to the query, the informational server further queries preference data to determine a destination address to which the message destined to the second party should be sent, and the informational server informs the first messaging server of the determined destination address, and
wherein the first messaging server further provides the second messaging server with the determined destination address for use by the second messaging server to process the message.

18. The system of claim 17, wherein the first messaging server selects the second messaging server based on the determined destination address.

19. The system of claim 17, wherein the preference data correlates with the second party a particular device having a particular address, and querying the preference data to determine the destination address comprises querying the preference data to determine as the destination address the address of the particular device.

* * * * *